United States Patent [19]

Pierce

[11] 4,190,984

[45] Mar. 4, 1980

[54] METHOD FOR CONSTRUCTING A SHRUBBERY SHAPER

[76] Inventor: Wendel D. Pierce, 704 Whittington, Bossier City, La. 71010

[21] Appl. No.: 904,745

[22] Filed: May 11, 1978

[51] Int. Cl.² ............................................. A01G 17/06
[52] U.S. Cl. .............................................. 47/58; 47/4
[58] Field of Search ....................... 47/1, 4, 45, 46, 47, 47/33, 58; 220/19; 140/107; 119/17

[56] References Cited

U.S. PATENT DOCUMENTS

| | | | |
|---|---|---|---|
| 1,895,282 | 1/1933 | Fisher | 47/4 |
| 2,132,568 | 10/1938 | Jacobs | 47/45 |
| 3,893,642 | 7/1975 | Van Vlaenderen | 220/19 X |
| 3,992,812 | 11/1976 | Horowitz | 47/33 X |
| 4,130,103 | 12/1978 | Zimmerman | 220/19 X |

*Primary Examiner*—Edgar S. Burr
*Assistant Examiner*—James R. Feyrer
*Attorney, Agent, or Firm*—John M. Harrison

[57] ABSTRACT

A method for constructing a shrubbery shaper for shaping plants and shrubs into a desired three dimensional form which includes the steps of tracing a suitable pattern in the configuration of an object which will form the shape of the shrubbery shaper; cutting a quantity of open mesh wire to a selected width and length to form a frame; shaping the open mesh wire into the pattern configuration; shaping side panels in the pattern configuration for attachment to the frame; planting suitable shrubbery at a selected location and spacing; and placing the shrubbery shaper over the planted shrubbery and securing it to the ground.

6 Claims, 5 Drawing Figures

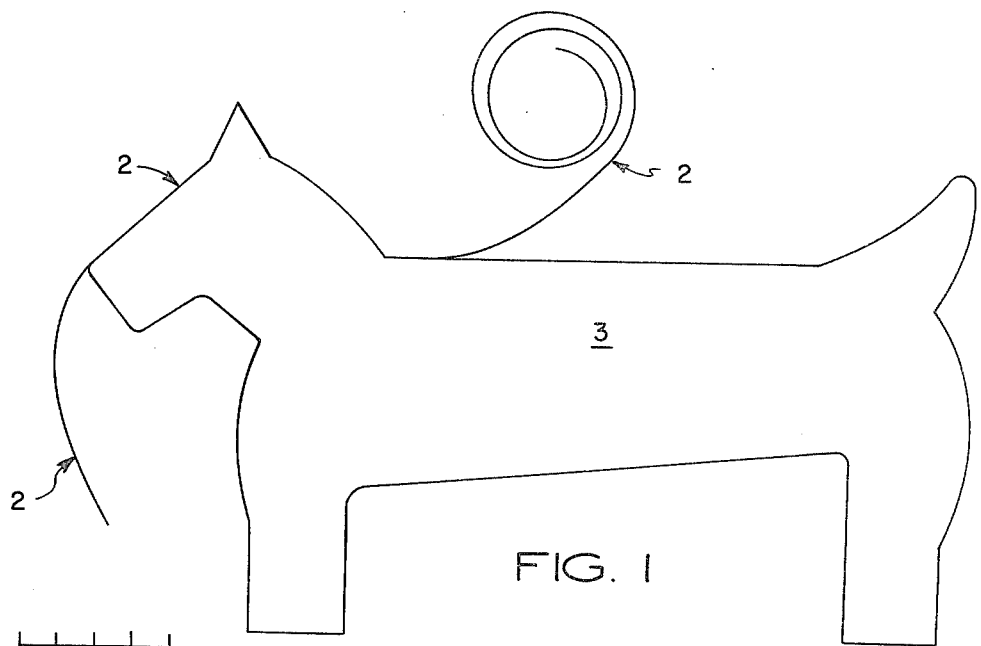
FIG. 1
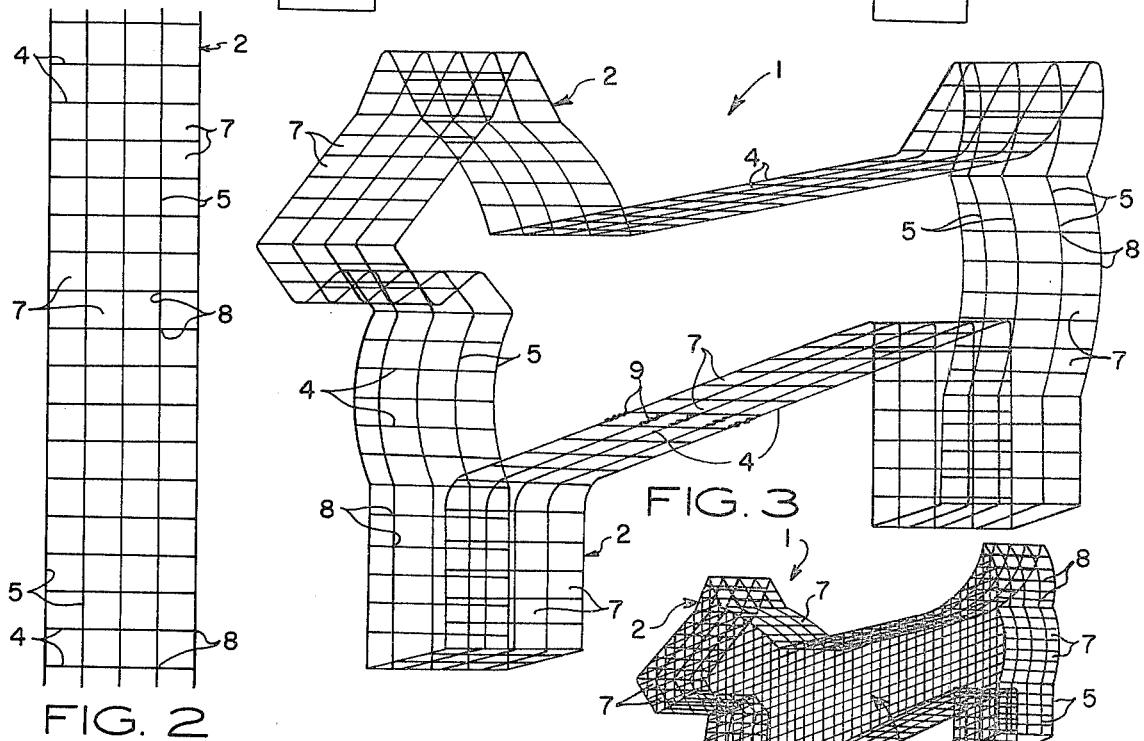
FIG. 2
FIG. 3
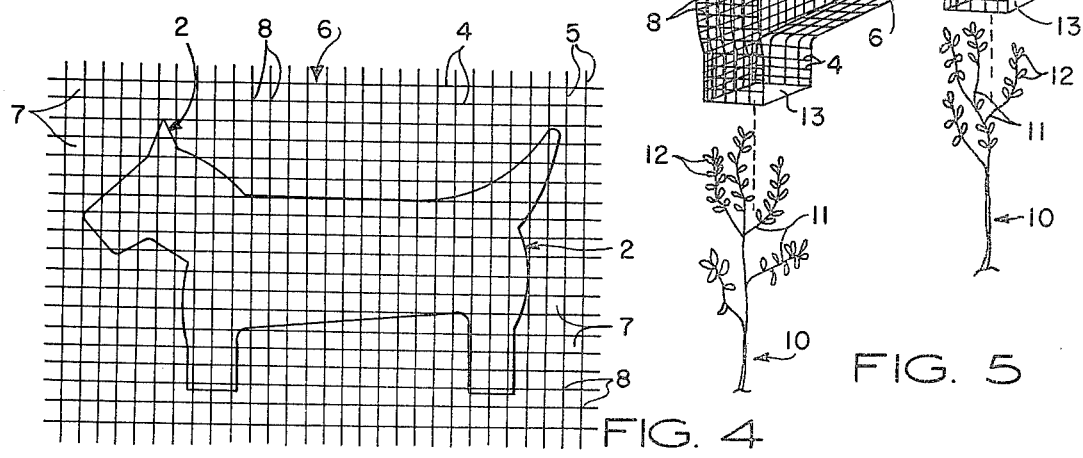
FIG. 4
FIG. 5

METHOD FOR CONSTRUCTING A SHRUBBERY SHAPER

BACKGROUND OF THE INVENTION

1. Field of the Invention

This invention relates to the art of topiary, and more particularly, to a new and improved technique for building an apparatus for training shrubbery and a method for constructing shrubbery shapers having a wide variety of forms and shapes from open mesh wire. The shrubbery shaper constructed by the technique of this invention can be manufactured in substantially any selected configuration and can be quickly and easily positioned over selected plants and shrubbery to train the shrubbery or plants in a relatively short period of time. The shrubbery shaper can be placed over one or more plants, hedges, shrubs, flowers or other shrubbery, including combinations of these plants, and used to train the plants as they are trimmed to conform to the configuration of the shrubbery shaper.

2. Description of the Prior Art

In landscape gardening, the art of clipping or trimming of shrubs or plants to decorative shapes such as those of animals, birds or geometrical forms is well known. Heretofore, the accurate and decorative shaping of plants, flowers, hedges and shrubbery has been chiefly limited only by the imagination and skill of the person doing the trimming. Because of the difficulty of creating a desired configuration by such shaping techniques in the topiary art, this type of landscaping has been rare and extremely expensive to produce and maintain. Accordingly, various mechanical aids have been devised by those skilled in the art to produce such attractive topiaries. U.S. Pat. No. 1,895,282 to R. Fisher discloses a "means for shaping hedges" which makes use of a flat wire screen mounted on a pole and positioned over a hedge in contact with the hedge limbs and leaves. The limbs are caused to be interwoven in the wire screen openings to ultimately cause a solid growth of hedge in and around the screen openings.

A similar use of open mesh wire and the like has been made in shaping planters from wire and plastic screen members, filling the planters with planter mix, moss, and the like, and planting flowers and plants in the planters. The flowers and fruit project through the mesh openings in the screen, and are then accessible for viewing and/or gathering.

A shortcoming which is inherent in prior art hedge shaper devices such as that disclosed in the Fisher patent lies in the fact that it is characterized by a two dimensional screen which is supported by means of a pole or stake over a hedge to be trained. Such devices are difficult to use and require a considerable amount of time to implement since each branch to be trained must apparently be meticulously and periodically threaded and rethreaded through the screen as the hedge grows. Furthermore, the device seems to be designed to beautify hedges only, since this type of growth appears to be the only type capable of being shaped by the screen in any useful and definitive manner.

Accordingly, it is an object of this invention to provide a technique for manufacturing a shrubbery shaper of substantially any shape and size which includes the steps of forming an appropriate pattern; cutting a section of open mesh screen wire having a selected mesh size into a selected width and a sufficient length to conform to the perimeter of the pattern and form a frame; shaping the frame so cut into the pattern configuration by bending it to conform to the shape of the pattern; cutting side panels of open mesh screen wire to close the sides of the molded frame; planting appropriate shrubbery at a selected spacing to correspond to the shrubbery shaper so manufactured; and placing the shrubbery shaper over the planted shrubbery in order that the shrubbery might ultimately fill and conform to the shape of the shrubbery shaper.

It is another object of this invention to provide a shrubbery shaper which is capable of shaping substantially any shrubbery, including flowers, plants, trees and hedges or combinations thereof into a desired configuration by using a pattern formed in a selected shape.

It is another object of this invention to provide a three dimensional shrubbery shaper having a selected configuration, which shaper can be formed and assembled by means of an appropriate pattern and open mesh wire, and placed over a selected plant or plants to continuously form the growing plant or plants into the pattern configuration.

Still another object of the invention is to provide a technique for forming a shrubbery shaper which includes the use of a selected pattern and a selected quantity of open mesh wire screen, one strip of which wire is formed in the shape of the pattern for use as a frame member and other segments of which are used to close the side openings created when the frame member is formed to the shape of the pattern.

Yet another object of the invention is to provide a shrubbery shaper pattern kit which includes a pattern formed in a selected configuration for constructing a shrubbery shaper and complete plans and specifications for constructing the shrubbery shaper using open mesh wire of selected diameter and mesh size and which is readily available at substantially any hardware store.

SUMMARY OF THE INVENTION

These and other objects of the invention are provided in a method for constructing a shrubbery shaper for training shrubs and plants in a desired three dimensional configuration which includes cutting a selected pattern of specified size and shape; cutting a strip of open mesh wire to a selected width and to a length sufficient to traverse the perimeter of the pattern; forming the wire into the shape of the pattern and binding the ends thereof together to form a frame; placing the frame so formed or the pattern itself over second and third segments of open mesh wire and cutting two side panels of open mesh wire to close the frame and complete the shrubbery shaper; planting a suitable shrub or shrubbery at suitable locations commensurate with the size and shape of the shrubbery shaper so formed; and placing the shrubbery shaper over the shrubbery and securing the shrubbery shaper to the ground.

BRIEF DESCRIPTION OF THE DRAWING

The invention will be better understood in view of the following description presented with reference to the accompanying drawing, wherein:

FIG. 1 of the drawing is a side elevation of a typical shrubbery shaper pattern of this invention formed in the shape of a dog;

FIG. 2 is a top elevation of a segment of open mesh wire suitable for forming in the shape of the pattern illustrated in FIG. 1 to serve as a frame member;

FIG. 3 is a perspective view of the segment of open mesh wire frame member illustrated in FIG. 2 and formed in the shape of the pattern illustrated in FIG. 1;

FIG. 4 is a top elevation of the pattern illustrated in FIG. 1 superimposed on a second segment of open mesh wire for forming a pair of side panels for the shrubbery shaper of this invention; and FIG. 5 is a perspective view of the shrubbery shaper of this invention in position to be placed over planted shrubbery.

DESCRIPTION OF THE PREFERRED EMBODIMENTS

Referring now to FIGS. 1-3 of the drawing, the first step in building the shrubbery shaper of this invention is to sketch and cut out a form or pattern 3 having the desired configuration for the shrubbery shaper 1 of this invention. It will be appreciated by those skilled in the art that pattern 3 may be of any desired shape and size, and may be cut from newspaper, butcher or poster paper or any other suitable material. After pattern 3 is formed in the desired shape, a frame 2 is provided from a roll or segment of open mesh wire of selected mesh size and diameter. By the term "open mesh wire" is meant horizontally and vertically disposed wire strands which are joined to form mesh openings, commonly called "fencing" or "wire screen". Typically, a segment of open mesh wire of desired width is clipped from one edge of the roll or segment to provide a frame 2 of selected width, as illustrated. In a preferred embodiment of the invention, frame 2 is formed of open mesh wire having vertical mesh members 5 and horizontal mesh members 4 forming mesh openings 7 and joined at mesh joints 8, of about two inches square, and a diameter of the horizontal mesh members 4 and vertical mesh members 5 of from about 1/16 to about ⅛ of an inch, the cut segment forming the frame 2 being from about six to about ten inches wide. In a most preferred embodiment of the invention the segment clipped from the main body of open mesh wire and forming frame 2 is about eight inches wide, the mesh openings 7 are about two inches square, and the diameter of the horizontal mesh members 4 and vertical mesh members 5 is about ⅛ of an inch, frame 2 thus having four mesh openings 7 across the width thereof as illustrated in FIG. 2 of the drawing. Frame 2 is clipped to a sufficient length such that it may be fashioned around the silouette or perimeter of pattern 3 and secured by means of mesh ties 9, as illustrated in FIG. 3 of the drawing.

Referring now to FIGS. 3-5 of the drawing, when frame 2 has been formed in the configuration of pattern 3, either frame 2 or pattern 3 may be superimposed upon a second segment of open mesh wire to form side mesh 6 as illustrated in FIG. 4 of the drawing. Side mesh 6 is then clipped in the shape of frame 2 or pattern 3 and a second side mesh 6 is formed from a third segment of open mesh wire after the first has been completed. Upon completion of the shaping of the two side mesh 6 members, one of the members is wired to frame 2 as illustrated in FIG. 5 of the drawing. As also illustrated in FIG. 5 of the drawing, the bottom ones of horizontal mesh members 4 and vertical mesh members 5 are cut away from the leg area of frame 2 forming the bottom of the legs to form leg openings 13 through which shrub limbs 11 of shrub 10 can be fitted to facilitate growth of shrub limbs 11 and shrub leaves 12 in the interior of shrubbery shaper 1. In a final step of the invention, after shrubs 10 have been planted in the proper spacing and have been fitted through leg openings 13 of frame 2, and after shrub limbs 11 and shrub leaves 12 have been properly oriented inside the cavity of shrubbery shaper 1, the second side mesh 6 is installed on frame 2 leaving shrub limbs 11 and shrub leaves 12 disposed inside shrubbery shaper 1 for future growth.

It will be recognized by those skilled in the art that shrubbery shaper 1 can be formed in substantially any desired shape, limited only by the imagination of the designer by first providing a pattern 3 of suitable shape, and subsequently forming a frame 2 and a pair of side mesh 6 with the appropriate shrubs 10 for interior growth. Furthermore, each one of side mesh 6 can be mounted on frame 2 of shrubbery shaper 1 in any convenient manner; however, in a preferred embodiment of the invention each of the side mesh 6 members are wired to frame 2 in order to provide a means for easy removal of either side mesh 6 as desired, in order to provide access to shrub 10.

It will be appreciated by those skilled in the art that the open mesh wire used in the invention may be characterized by bare wire or may have a vinyl or rubber coating of suitable color and thickness thereon, as desired. In a preferred embodiment of the invention, the open mesh wire used in creating the shrubbery shaper of this invention is characterized by galvanized wire, and in addition thereto, is fitted with a thin layer of green vinyl to further insure long life and reduce visibility while exposed to the elements. Furthermore, the wire should be capable of being easily bent and formed for shaping around the perimeter of the pattern to be used and in a preferred embodiment of the invention, a roll or length of such wire having a width of about thirty-six inches is preferred to create a shrubbery shaper having a height of about twenty-four inches. Open mesh wire of this width permits the use of a preferred eight inch strip of wire as the frame member, leaving a four inch margin for forming the two twenty-four inch high side mesh members.

While it will be appreciated by those skilled in the art that a variety of plants may be utilized in the invention, it has been found that boxwood and dwarf youpon provide perhaps the best foliage for filling the interior of the shrubbery shaper of this invention. These plants grow relatively fast and provide full, thick foliage which facilitates a complete filling of the shrubbery shaper and permits easy training of the branches. Other plants which are suitable for use in the shrubbery shaper of this invention are plants of the juniper family, dwarf or Japanese holly, and similar plants known to those skilled in the art.

Referring again to the drawing, once the shrub limbs 11 and shrub leaves 12 have grown inside the shrubbery shaper to the extent that the foliage is projecting from the frame 2 and side mesh 6, the final step in creating an artistic shrub by use of the shrubbery shaper of this invention is to trim the shrub limbs 11 and shrub leaves 12 of shrub 10 as they project from mesh opening 7 of shrubbery shaper 1. This trimming should be accomplished at a level slightly above the mesh openings 7 in order to facilitate a shape or configuration which is slightly larger than the shrubbery shaper 1 in order that the shrubbery might cover and hide the frame 2 and side mesh 6.

Having described my invention with the particularity set forth above what is claimed is:

1. A method of constructing a shrubbery shaper for growing shrubbery in a selected configuration comprising:
   (a) cutting a pattern in said configuration;
   (b) shaping a first length of open mesh wire of selected width around the perimeter of said pattern to conform to said configuration and form a frame for said shrubbery shaper;
   (c) superimposing said pattern on a second length of open mesh wire and cutting said second length of open mesh wire into the shape of said pattern and said frame;
   (d) superimposing said pattern on a third length of open mesh wire and cutting said third length of open mesh wire into the shape of said pattern and said frame;
   (e) fastening said second length and said third length of said open mesh wire to said first length of said open mesh wire to close said frame; and
   (f) positioning said shrubbery shaper over shrubbery to be trained or shaped, whereby the branches of said shrubbery are located inside said shrubbery shaper.

2. The method of claim 1 further comprising anchoring said frame to the ground.

3. The method of constructing shrubbery shaper of claim 1 further comprising removing the bottom segments of that portion of said frame which is horizontally disposed on the ground to facilitate insertion of said shrubbery into the interior of said shrubbery shaper and anchoring said frame to the ground.

4. The method of constructing shrubbery shaper of claim 1 further comprising planting at least one shrub of selected size and spacing to fit inside said shrubbery shaper.

5. A method of constructing a shrubbery shaper for growing shrubbery in a selected configuration comprising:
   (a) cutting a pattern in said selected configuration;
   (b) selecting a quantity of open mesh wire and shaping a first length of said open mesh wire of selected width around the perimeter of said pattern to conform to said configuration and securing the ends of said first length of open mesh wire to form a frame of said shrubbery shaper;
   (c) superimposing said frame on a second length and a third length of open mesh wire, each having a sufficient length and width to cover said frame, and cutting said second length and said third length of open mesh wire to conform to said selected configuration and said frame;
   (d) planting at least one shrub of selected size and spacing to fit inside said shrubbery shaper;
   (e) fastening said second length of open mesh wire to said frame to close one side of said frame;
   (f) removing the bottom segments of that portion of said frame which is horizontally disposed on the ground to facilitate insertion of said at least one shrub into the interior of said shrubbery shaper;
   (g) positioning said shrubbery shaper over said shrubbery; and
   (h) fastening said third length of open mesh wire to said frame to close said frame.

6. The method of constructing shrubbery shaper of claim 5 further comprising anchoring said frame to the ground.

* * * * *